Patented Feb. 27, 1934

1,948,589

UNITED STATES PATENT OFFICE 1,948,589

COMPOSITIONS AND SOLUTIONS FOR USE IN DYEING AND TEXTILE PRINTING

Mordecai Mendoza, West Didsbury, and Arthur George Murray, Whitefield, England, assignors to Imperial Chemical Industries Limited, a corporation of Great Britain No Drawing. Application April 25, 1932, Serial No. 607,494, and in Great Britain May 1, 1931

12 Claims. (Cl. 8—6)

This invention relates to the production of dry compositions for use in dyeing and textile printing processes and to the production of solutions therefrom.

According to the invention we obtain dry compositions for use in dyeing and textile printing by incorporating in the dry state an N-sulphonic acid obtainable by the action of a water soluble sulphite on a diazonium compound, with or without subsequent reduction, and a compound or mixture, which, in an acidified aqueous solution, possesses oxidizing properties. Further, according to the invention we obtain solutions directly applicable in dyeing and textile printing processes and particularly applicable to the production of dyeings by the "ice-colour" process using arylamides of 2:3-hydroxynaphthoic acid or diacetoacetyldiamines.

It is known that when diazonium compounds are treated with sodium sulphite or ammonium sulphite or other water-soluble sulphite in aqueous solution there are formed, according to conditions, diazonium sulphonic acids or arylhydrazine-$\alpha\beta$-disulphonic acids (see Gattermann, Die Praxis des organischen Chemikers, edited by Wieland, 21st. Edition, Berlin 1928, page 279; Houben, Die Methoden der organischen Chemie, 1925, Vol. II, page 421; Davies, Journal of the Chemical Society, 1922, 121, page 715; Bamberger and Meyerberg, Berichte der deutschen chemischen Gesellschaft, 1897, 30, 374); and it is further known that by mild reduction, e. g. by addition of zinc dust to their aqueous solutions, these compounds are converted into a $\alpha$-arylhydrazine-$\beta$-sulphonic acids. It is also known that when arylhydrazines are treated with potassium pyrosulphate the same $\alpha$-arylhydrazine-$\beta$-sulphonic acids are obtained (Fischer, Liebig's Annalen, vol. 190, page 97). The compounds, the use of which is contemplated in the invention, are such compounds as may be obtained eventually by these processes from arylamines devoid of hydroxyl or sulphonic or carboxylic acid groups. The compounds or mixtures which possess oxidizing properties in an acidified aqueous solution are for example, the soluble persulphates, the soluble perborates, the soluble bromates or mixtures of alkali bromides and alkali bromates or of alkali chlorides and alkali chlorates. Generally we find that such compounds or mixtures as will on contact with hydrogen halide in aqueous solution generate free halogen are particularly suitable.

The substances necessary for generating an acidified aqueous solution may be present in the dry composition for example, an acid salt, e. g. sodium hydrogen sulphate, may be added, but when the dry composition is to be stored, the advantages of adding an acid salt are outweighed by the disadvantages of susceptibility to moisture and need for special containers.

It is noteworthy that the compounds obtained by the action of sulphites on diazonium compounds are readily soluble in water, moreover, they undergo no decomposition when moderate heat is applied. The dry compositions obtained in accordance with our invention are thus readily dissolved in water and by simple addition of acid (if necessary because an acid salt has not been added) to the aqueous solution a diazo solution is obtained. The dry compositions produced in accordance with the invention can be readily stored, provided that they contain no acid salt as indicated above, and are eminently suitable for use in tropical countries.

The invention is illustrated but not limited by the following examples in which the parts are by weight.

Example 1

The solution of the diazonium compound obtained in the customary manner from 141.5 parts of 5-chloro-o-toluidine is added with stirring to a solution of 160 parts of potassium sulphite ($K_2SO_3$) in 350 parts of water. The temperature during addition is kept below 10° C. and the reaction is maintained slightly alkaline to test paper by addition of sodium bicarbonate. The diazonium sulphonate is precipitated in the form of a bright yellow crystalline mass which after stirring for some hours is filtered off, pressed and dried.

A composition is prepared by grinding 256 parts of the dried diazonium sulphonate with 250 parts of dry potassium bromide and bromate mixture ($5KBr+KBrO_3$) and 500 parts of acid potassium sulphate. On dissolving this composition in water a solution of diazotized 5-chloro-o-toluidine is obtained which may be utilized for the preparation of azo dyestuffs in the known manner.

Example 2

152 parts of 3-nitro-4-toluidine are diazotized in the usual manner and the diazo solution is added below 10° C. with stirring to a solution of 480 parts of potassium sulphite in about 1,200 parts of water. The reaction mixture is kept slightly alkaline by addition of sodium bicarbonate as necessary. A partial precipitation of yellow crystals occurs during the addition. The mixture is then heated to 70° C. for about 2 hours and the solution so obtained is then concentrated until crystallization begins. It is then cooled and the yellow crystalline mass which separates is filtered off and dried. The dry material is ground with 120 parts of potassium bromate to give a dry composition.

On dissolving the composition in water and acidifying the solution with hydrochloric acid a diazo solution is obtained which may be used for preparing azo dyestuffs.

*Example 3*

A diazonium sulphonate paste, obtained as described in Example 1 but not dried is thinned down by adding 2000 parts of cold water; 300 parts of glacial acetic acid are added and the compound is reduced by stirring for about 10 hours with 400 parts of zinc dust. α-(4-chloro-6-methyl-) phenyl hydrazine β-sulphonic acid, zinc salt, is produced. The mixture, a pale coloured suspension, is then made alkaline to Brilliant Yellow paper by addition of sodium carbonate and filtered. The filtrate on addition of common salt deposits the sodium salt of the hydrazine sulphonic acid. This is filtered and dried. A composition is made by grinding 259 parts of the dried sulphonate with 120 parts of dry potassium bromate. On dissolving this composition in water and acidifying the solution with hydrochloric acid a solution of the diazonium compound is obtained.

*Example 4*

141.5 parts of 5-chloro-o-toluidine are diazotized in the usual manner and the diazo solution is added below 10° C. with stirring to a solution of 2112 parts of crystalline sodium sulphite in about 3000 parts of water. The reaction mixture is kept slightly alkaline by addition of sodium bicarbonate as necessary. The mixture is allowed to stir until the yellow crystalline substance first formed dissolves completely. The operation requires about 200 hours for completion. The solution is filtered and evaporated until crystallization commences. The colourless crystalline product obtained on cooling and consisting of crude 5-chloro-o-tolyl-hydrazine-α-β-disulphonate is filtered off and separated from excess sodium sulphite by fractional crystallization from water.

361 parts of the dried 5-chloro-o-tolylhydrazine-α-β-disulphonate are then ground with 120 parts of potassium bromate to give a dry composition.

On dissolving the composition in water and acidifying the solution with hydrochloric acid a solution of the diazonium compound is obtained which may be used for preparing azo dyestuffs.

*Example 5*

152 parts of m-nitro-p-toluidine are diazotized in the usual manner and the diazo solution is added below 10° C., with stirring, to a solution of 252 parts of crystalline sodium sulphite in about 500 parts of water, the reaction mixture being kept slightly alkaline by the addition of sodium carbonate as necessary. The resulting solution is allowed to stir until the diazo compound has disappeared and then saturated with salt. The yellow crystalline compound which separates is filtered off and dried.

267 parts of the dry sulphonate are ground with 55.7 parts of potassium bromate to give a dry composition.

10 parts of the so-obtained composition are dissolved in 200 parts of water and 4.3 parts of hydrochloric acid (32° Tw.) added to the solution. After stirring for 15 to 20 minutes development of the diazo compound is complete and the solution can be bulked to any suitable volume.

*Example 6*

244 parts of dianisidine are diazotized in the usual manner and the diazo solution is added below 10° C. with stirring, to a solution of 500 parts of crystalline sodium sulphite in about 1200 parts of water, the reaction mixture being kept slightly alkaline by the addition of sodium carbonate as necessary. The diazosulphonate separates immediately and after stirring until the diazo-compound has disappeared it is filtered off and dried.

474 parts of the dry diazosulphonate are ground with 111.4 parts of potassium bromate to give a dry composition.

10 parts of the so-obtained dry composition are suspended in 200 parts of water and 4.3 parts of hydrochloric acid (32° Tw.) added. After stirring for 15 to 20 minutes development of the diazo compound is complete and the solution can be bulked to any volume suitable for the manufacture of azo dyestuffs.

*Example 7*

141.5 parts of 4-chloro-o-toluidine are diazotized in the usual manner and the diazo solution added below 10° C., with stirring, to a solution of crystalline sodium sulphite dissolved in about 500 parts of water the reaction mixture being kept slightly alkaline by the addition of sodium bicarbonate as necessary. After stirring until the diazo compound has disappeared, the diazosulphonate which separates almost immediately is filtered off and dried.

256.5 parts of the diazosulphonate are ground with 55.7 parts of potassium bromate and 495 parts of sodium sulphate to give a dry composition.

10 parts of the mixture prepared as described in Example 6 are suspended in 66 parts of water and 2.9 parts of hydrochloric acid (32° Tw.) added. After stirring for 15 to 20 minutes development of the diazo compound is complete and the solution may be bulked to any volume suitable for the manufacture of azo dyestuffs.

As many apparently widely different embodiments of this invention may be made without departing from the spirit and scope thereof, it is to be understood that we do not limit ourselves to the specific embodiments thereof except as defined in the appended claims.

We claim:

1. As a new composition of matter a dry mixture comprising an N-sulphonic acid, selected from the group consisting of aryldiazonium sulphonic acids, arylhydrazine-αβ- disulphonic acids and α-arylhydrazine-β-sulphonic acids, derived from arylamines free from hydroxyl, sulphonic or carboxylic acid groups, together with an agent which in acidified aqueous solution has oxidizing properties.

2. As a new composition of matter a dry mixture as claimed in claim 1 together with an acid salt.

3. As a new composition of matter a dry mixture as claimed in claim 1 together with an alkali metal hydrogen sulphate.

4. As a new composition of matter a dry mixture as claimed in claim 1 together with sodium hydrogen sulphate.

5. As a new composition of matter a dry mixture as claimed in claim 1, in which the agent having in acidified aqueous solution oxidizing properties is a mixture of a water-soluble bromate and a water-soluble bromide.

6. As a new composition of matter a dry mixture as claimed in claim 1, in which the agent having in acidified aqueous solution oxidizing properties is a mixture of a water-soluble bromate and a water-soluble bromide, an acid salt being also present.

7. As a new composition of matter a dry mixture as claimed in claim 1, in which the agent having in acidified aqueous solution oxidizing properties is a mixture of a water-soluble bromate and a water-soluble bromide, sodium hydrogen sulphate being also present.

8. As a new composition of matter a dry mixture as claimed in claim 1, in which the agent having in acidified aqueous solution oxidizing properties is a water-soluble bromate.

9. As a new composition of matter a dry mixture as claimed in claim 1, in which the agent having in acidified aqueous solution oxidizing properties is potassium bromate.

10. As a new composition of matter a dry mixture comprising a water-soluble bromate, a water-soluble bromide, and an N-sulfonic acid having the following probable formula:

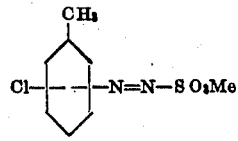

in which Me represents a metal ion.

11. As a new composition of a matter a dry mixture as claimed in claim 10 together with an acid salt.

12. As a new composition of matter a dry mixture as claimed in claim 10 together with sodium hydrogen sulphate.

MORDECAI MENDOZA.
ARTHUR GEORGE MURRAY.